United States Patent [19]

Chenard

[11] Patent Number: 5,731,384
[45] Date of Patent: Mar. 24, 1998

[54] ETHYLENE, VINYL ACETATE AND VINYLALKOXYSILANE COPOLYMER HOT-MELT ADHESIVES

[75] Inventor: Jean-Yves Chenard, Pau, France

[73] Assignee: Elf Atochem S.A., Puteaux, France

[21] Appl. No.: 720,547

[22] Filed: Sep. 30, 1996

[30] Foreign Application Priority Data

Sep. 28, 1995 [FR] France ................................. 95 11384

[51] Int. Cl.[6] ................................................. C08F 30/08
[52] U.S. Cl. ........................................................ 525/326.5
[58] Field of Search ........................................... 525/326.5

[56] References Cited

U.S. PATENT DOCUMENTS 5,209,977  5/1993  Heimberg et al. ..................... 428/402

FOREIGN PATENT DOCUMENTS 2689134  3/1992  France .
2197326  5/1988  United Kingdom .
WO 92/00362  1/1992  WIPO .

OTHER PUBLICATIONS

A.M. Henderson, TAPPI Proceedings, 1994 Hot Melt Symposium, p.81.

*Primary Examiner*—Edward J. Cain
*Attorney, Agent, or Firm*—Pennie & Edmonds LLP

[57] ABSTRACT

The present invention relates to hot-melt adhesive compositions based on copolymers of ethylene, vinyl acetate and vinylalkoxysilane units, which are crosslinkable by moisture, wherein the hot-melt adhesive is substantially anhydrous. More particularly, it relates to the storage stability of the hot-melt adhesive compositions including at least one crosslinking catalyst. The invention also relates to a process for the manufacture of the hot-melt adhesive composition comprising drying the hot-melt adhesive under vacuum at a temperature lower than 180° C. and purging with a dry gas at a temperature lower than 180° C.

17 Claims, No Drawings

ETHYLENE, VINYL ACETATE AND VINYLALKOXYSILANE COPOLYMER HOT-MELT ADHESIVES

TECHNICAL FIELD

The present invention relates to hot-melt adhesive compositions based on copolymers of ethylene, vinyl acetate and vinylalkoxysilane units, which are crosslinkable by moisture. More particularly, it relates to the storage stability of the hot-melt adhesive compositions including at least one crosslinking catalyst.

BACKGROUND OF THE INVENTION

Hot-melt adhesives are formulations which are solid at ordinary temperature, which are applied in the molten state (for example between 130° and 180° C.) and which harden on cooling. They generally comprise two main constituents: a thermoplastic polymer and a tackifying resin. A number of additives such as waxes, stabilizers, fillers and crosslinking catalyst are, in most cases, added to them.

Hot-melt adhesives offer many advantages in industrial use including:

easy application in automated plants, short setting times (a few seconds), thereby permitting high bonding speeds, very good adhesion to a wide variety of substrates, such as paper, wood, cardboard, textiles, plastics, glass, aluminum and others, and reasonable cost.

Hot-melt adhesive compositions based on a copolymer of ethylene and vinylsilane or based on a copolymer of ethylene, vinyl acetate and vinylsilane have already been described in various patents. Thus GB Patent 2,197,326 describes a hot-melt adhesive composition based on silane-grafted ethylene-vinyl acetate copolymer which has a low melt index (<100). To store these compositions in the presence of a crosslinking catalyst, these authors employ a special cartridge containing a desiccant such as silica gel.

A. M. Henderson (TAPPI Proceedings, 1994 Hot Melt Symposium, page 81) has described the use of an ethylene-vinyl acetate-vinylalkoxysilane copolymer, which has a low melt index (<5), as an adhesive. Good adhesion at elevated temperature has been successfully obtained only for adhesive compositions in which the copolymer content is higher than 75% by weight. In addition, to obtain sufficient stability in storage, it is necessary to package these adhesive compositions separately from the crosslinking catalyst.

Furthermore, the application of hot-melt adhesives based on copolymers of low melt index is not very easy. According to GB 2,197,326 and Henderson, this application consists, first, in forming a film from the adhesive and then in inserting it between the substrates to be bonded. Thus, all the advantages of the hot-melt adhesive are lost.

Hot-melt adhesive compositions based on an ethylene-vinyltrimethoxysilane copolymers with a melt index higher than 100 are the subject of Canadian Patent 2,113,961. A sufficient storage stability of these adhesive compositions, which include a crosslinking catalyst, has been successfully obtained only after the latter has been encapsulated with a polymer produced by emulsion polymerization.

SUMMARY OF THE INVENTION

The present invention relates to a hot-melt adhesive composition comprising a copolymer of ethylene, vinyl acetate and vinylalkoxysilane and including at least one crosslinking catalyst, wherein the hot-melt adhesive is substantially anhydrous. The invention also relates to a process for the manufacture of the hot-melt adhesive composition comprising drying the hot-melt adhesive under vacuum at a temperature lower than 180° C. and purging with a dry gas at a temperature lower than 180° C.

DETAILED DESCRIPTION OF THE INVENTION

Hot-melt adhesive compositions have now been found which do not exhibit the above-mentioned disadvantages and which, furthermore, offer the advantage of being capable of being easily applied at relatively low temperature (for example, lower than 140° C.). The hot-melt adhesive compositions based on copolymers of ethylene, vinyl acetate and vinylalkoxysilane and which have a melt index higher than 150° form the subject-matter of the present invention.

Another object of the present invention relates to the storage stability of hot-melt adhesive compositions based on a copolymers of ethylene, vinyl acetate and vinylalkoxysilane and including at least one crosslinking catalyst. It is not necessary for this catalyst to be encapsulated.

The present invention therefore provides hot-melt adhesive compositions based on a copolymer of ethylene, vinyl acetate and vinylalkoxysilane, characterized in that the melt index of the copolymer at 190° C. is higher than 150° and preferably between 400° and 1200°. The compositions according to the invention are preferably based on a copolymer including ethylene, vinyl acetate and ungrafted vinylalkoxysilane units.

The present invention also relates to the hot-melt adhesive compositions based on a copolymer of ethylene, vinyl acetate and vinylalkoxysilane including at least one crosslinking catalyst, characterized in that they are substantially anhydrous. The water content of these compositions is preferably lower than 1000 ppm. A water content lower than 200 ppm is more preferred.

The copolymer according to the invention can be obtained by radical polymerization of ethylene, vinyl acetate and of vinylalkoxysilane at high pressure in a tubular reactor according to a process described in French Patent 2,689,134.

This copolymer may include, in percentage on a weight basis:

50–89% of ethylene

10–45% of vinyl acetate

1–5% of a vinylalkoxysilane of the formula

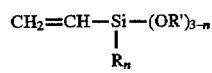

where R denotes a hydrocarbon radical containing from 1 to 8 carbon atoms;

R'=—CH$_3$, —C$_2$H$_5$, or —CH$_2$—CH$_2$—OCH$_3$;

and n=0, 1 or 2, preferably with n=0 or 1.

Particular vinylalkoxysilanes which are suitable include vinyltrimethoxysilane (VTMS), vinyltriethoxysilane, vinyltri(ethoxymethoxy)silane, vinylmethyldimethoxysilane, vinylmethoxydimethylsilane, vinylmethyldiethoxysilane, vinylethoxydimethylsilane, vinylmethyldi(ethoxymethoxy)silane, vinylethyldimethoxysilane and vinyl(ethoxymethoxy)dimethylsilane. Vinyltrimethoxysilane and vinylmethyldimethoxysilane are preferably employed.

The hot-melt adhesive compositions of the invention may include one or more copolymers with ethylene, vinyl acetate and vinylalkoxysilane units.

The tackifying resin, another main constituent of hot-melt adhesives, can be chosen from the classes of rosins, terpene resins and petroleum resins. The preferred tackifying resins are aliphatic, aromatic or terpene hydrocarbon resins, optionally modified or hydrogenated. They can be employed in a resin/copolymer weight ratio of between 0.3 and 3. The resin/copolymer weight ratio is preferably between 0.5 and 2.

These tackifying resins may be solid or liquid. The use of liquid resins in combination with copolymers with a high vinyl acetate content (for example higher than 30%) makes it possible to obtain pressure-sensitive adhesive formulations. Pressure-sensitive adhesive formulations are intended to mean formulations which have a high adhesion at ambient temperature. In this case the adhesion is produced, at ambient temperature, merely by bringing together under pressure substrates which have previously been coated with adhesives.

The tackifying resins must be free from functional groups such as hydroxides, which are capable of reacting with the alkoxy groups of the copolymer, and must be carefully dried before use.

The presence of an optional catalyst improves the speed of crosslinking. In general, all the catalysts which accelerate the crosslinking reaction of the alkoxy groups carried by the copolymers of the invention are suitable.

Catalysts based on tin salts, such as dibutyltin laurate (DBTL) or stannous octoate are preferably chosen. The amount employed is generally between 0.01 and 1% by weight relative to that of the copolymer, and preferably between 0.025 and 0.2%. The tin salts may be employed either alone or in combination with low-volatility amines such as laurylamine. The amount of amine employed is generally between 0 and 0.5% and preferably between 0 and 0.1% by weight relative to that of the copolymer. These catalysts are added to the composition of the invention without the need for any processing.

Besides the main constituents and the crosslinking catalysts, the hot-melt adhesives may optionally contain waxes, plasticizers, antioxidants, colorants, dehydrating agents and various fillers which are chemically inert towards the alkoxy groups of the copolymers and which are optionally dried before being used.

The dehydrating agents enable the storage stability of the hot-melt adhesives to be improved by removing any trace of water that might remain after the manufacture of these adhesives. To ensure satisfactory stability the total water content of the hot-melt adhesives is preferably lower than 1000 ppm and more preferably lower then 200 ppm relative to the weight of the adhesive. Low-volatility trialkoxysilanes, such as vinyltri(methoxyethoxy)silane (VTMES), are preferably employed.

The quantity of dehydrating agent may be, for example, up to 5 parts by weight per 100 parts of copolymer. The amount present depends, of course, on the quantity of water which the agent can bind. The quantity of dehydrating agent is preferably between 1 and 4 parts per 100 parts of copolymer and, more preferably, 2 to 3 parts. The dehydrating agent is preferably an alkoxysilane of low volatility and/or an alkoxysilane which is hydrolysed more easily than the silane of the copolymer.

Another object of the present invention is a process for obtaining these adhesive compositions including at least one crosslinking catalyst.

According to the invention, the process is characterized in that the copolymer or copolymers are subjected to drying under vacuum at a temperature lower than 180° C., followed by a purge with a dry gas at a temperature lower than 180° C. The drying temperature and the purging temperature with the dry gas is preferably between 100° C. and 140° C. The dry gas employed for purging the copolymers may be, for example, air or nitrogen.

The substantially anhydrous hot-melt adhesive compositions of the invention may be manufactured by:

mixing and drying under vacuum at 120° C. the copolymer or the copolymers of ethylene-vinyl acetate-vinylalkoxysilane, resins, waxes, colorants, antioxidants and, optionally, fillers in a jacketed reactor fitted with an anchor stirrer, and after having purged with the aid of a dry gas, adding thereto successively at 120° C. the dehydrating agent and the catalyst.

After a final bubble removal under vacuum at 120° C., the hot-melt adhesive ready for use is recovered by casting. It can be employed immediately or packaged and protected from moisture in leakproof cartridges.

These hot-melt adhesives can be applied at 130° C. and their viscosity at this temperature is on the order of 1 to 15 Pa.s for compositions containing no filler. After being kept for 4 hours at 130° C., the increase in the viscosity of the adhesives does not exceed 10%, which is compatible with the requirements of industrial coating machines.

These hot-melt adhesive compositions of the invention exhibit very good adhesion to various substrates. Remarkable adhesive properties at high temperature have been obtained, particularly on glass and aluminum.

Thus, the present invention provides hot-melt adhesives which offer ease of application, high storage stability, an appropriate assembly time, high initial cohesion, a temperature of creep under load which increases as the crosslinking progresses and product flexibility after complete crosslinking.

EXAMPLES

The following non-limiting examples are merely illustrative of the preferred embodiments of the present invention, and are not to be construed as limiting the invention, the scope of which is defined by the appended claims.

In the examples which follow, reference is made to various methods of evaluation of thermal and mechanical properties of the adhesives in bulk (tensile strength, hardness, etc.) or of the adhesively bonded joints (initial cohesion, shear adhesion failure temperature or SAFT resistance, peel strength, etc.).

The following test procedures are employed:

The initial cohesion test measures the speed of setting of the adhesive during the seconds following adhesive bonding. The measurement of initial cohesion is performed by depositing a line of hot-melt adhesive approximately 1.5 mm in diameter onto a cardboard test piece 40 mm in width. A second cardboard test piece identical with the first is immediately applied and the adhesively bonded joint produced is immediately suspended vertically by its upper end. The lower end is loaded with masses of 150, 250 and 350 g after 15, 30 and 60 seconds. The behavior of the adhesively bonded joint is assessed as follows:

no creep: no relative movement of the test pieces very slight creep: slip on the order of a millimeter creep: slip on the order of a centimeter no cohesion: rupture of the adhesively bonded joint.

The SAFT test (ASTM standard D4498) is a test which measures the maximum temperature withstood by an adhesively bonded joint under a given load. The procedure used is as follows. Two strings of adhesive, approximately 1 mm in diameter and approximately 15 mm apart from one another are deposited at 130° C. at the end of a cardboard test piece 40 mm in width. A second test piece, identical with the first, is immediately applied and the adhesively bonded assembly thus obtained is allowed to cool. The bonding area thus obtained is approximately 10 cm² (2.5 cm×4 cm). The adhesively bonded assembly is then suspended vertically in an oven, loaded with a mass of 250 g and then subjected to a temperature rise from 25° to 200° C. at the rate of 0.4°/min. The SAFT resistance is the temperature at which the assembly gives way. This test is performed during the days following the adhesive bonding. It demonstrates the improvement over the course of time of the temperature resistance of the hot-melt of the invention as a result of the progressive crosslinking of the adhesive.

The peeling tests were performed in accordance with NFT standard T76-112. In the case of aluminum/aluminum bonding, the test was carried out according to the so-called T peeling method (part 2 of the standard). To begin with, a 170×170 mm adhesively bonded plate is manufactured by depositing a suitable quantity of adhesive at 130° C. and then pressing at the same temperature between two aluminum sheets, each of 0.1 mm thickness.

A 170×170×1 mm square metal frame is used when depositing the adhesive. This enables the desired thickness of the adhesive joint (1 mm) to be ensured. Strips of 25 mm width are cut from the plate obtained with a guillotine after cooling. The adhesive bonding is produced without any preparation of the aluminum surface. The T peeling test is performed at a speed of 100 mm/min.

In the case of adhesive bonding to glass, the test was carried out according to the so-called floating rollers method (part 1 of the standard). The joint is produced by depositing and then pressing at 130° C. (contact pressure) the adhesive between a strip of cotton fabric and a 200×20 mm glass plate. Iron wires are used when depositing the adhesive. This enables an adhesive thickness, which is substantially uniform and equal to 0.5 mm, to be ensured. The glass employed is 5 mm in thickness and is degreased with acetone before bonding. The traction speed employed is 100 mm/min.

The tensile mechanical characteristics of the adhesives in bulk were determined on type H2 dumbbell test pieces (NFT standard 51-034) cut from a sheet of adhesive 2 mm in thickness. The traction speed employed is 50 mm/min. This test method is further described in U.S. Pat. Nos. 5,554,687, 5,506,296, 5,318,849 and 5,116,442, which are hereby incorporated in their entirety.

The Shore A hardness was measured according to NFT standard 51-109. This test method is further described in U.S. Pat. No. 5,250,628, which is hereby incorporated in its entirety.

The melt index (MI) was measured at 190° C. under 2.16 kg according to ASTM standard D 1238-70 and expressed in g/10 min.

In all the examples, the quantity of the monomers employed is given in percentage by weight. The following materials and abbreviations are used in the examples:

E/VA/VTMS copolymer=ethylene-vinyl acetate-vinyltrimethoxysilane terpolymer

Escorez 5300 resin=hydrogenated hydrocarbon resin (Exxon)

Krystalex F85 resin=α-methylstyrene resin (Hercules)

Victory Amber wax=plastic microcrystalline wax (Petrolite)

$H_2$ wax=Fischer Tropsch wax (Sasol)

Irganox 1010 antioxidant=tetrakis[3-methylene(3', 5'-di-tert-butylhydroxyphenyl)propionate]methane (Ciba)

Hercures AR 100 resin=aliphatic modified aromatic hydrocarbon resin (Hercules)

68°–70° C. paraffin wax=standard paraffin wax

Be Square 195 wax=hard microcrystalline wax (Petrolite)

Example 1

The copolymer employed has the following characteristics:

67.9% ethylene 29.4% vinyl acetate 2.7% VTMS

MI at 190° C.=1000

The formulation of the hot-melt adhesive is as follows (in parts by weight):

| | |
|---|---|
| E/VA/VTMS copolymer | 100 |
| Escorez 5300 resin | 83 |
| Krystalex F85 resin | 32 |
| Victory Amber wax | 64 |
| $H_2$ wax | 32 |
| Irganox 1010 antioxidant | 3.2 |
| DBTL | 0.14 |
| Laurylamine | 0.035 |
| VTMES | 2.24 |

The viscosity of the hot-melt adhesive at 130° C. is 870 mPa.s immediately after manufacture. After 4 hours at 130° C. in the absence of moisture, this viscosity rises to 950 mPa.s, an increase of 9%. After 30 days storage at 25° C. in leakproof packaging the viscosity, still measured at 130° C., is 1050 mPa.s, an increase of 20%. The initial cohesion of the formulation is good: no creep under 350 g after 15 seconds. SAFT tests were performed in the above-mentioned conditions after 1 day and 15 and 30 days storage at 25° C. The results are as follows:

| | SAFT under 250 g (°C.) | | |
|---|---|---|---|
| Crosslinking period | Period of storage under $N_2$ (in days) | | |
| (in days) | 1 | 15 | 30 |
| 1 | 70 | 74 | 72 |
| 2 | 72 | 76 | — |
| 3 | 74 | 76 | — |
| 4 | 81 | — | — |
| 5 | — | 87 | — |
| 6 | 90 | 92 | 86 |
| 7 | 90 | 91 | 92 |
| 8 | 93 | >200 | 90 |
| 9 | <200 | — | >200 |

This example demonstrates the good thermal resistance of the adhesives of the invention after crosslinking and their good storage stability in leakproof packages at ambient temperature.

Example 2

The copolymer employed is that of Example 1. The formulation employed is identical with that of Example 1 except for the laurylamine content, which has been doubled. The initial viscosity at 130° C. is 870 mPa.s and rises to 890 mPa.s after 4 hours at 130° C., an increase of 2%. The SAFT resistance greater than 200° C. is obtained after 7–8 days crosslinking. The other characteristics are unchanged, in particular the storage stability, which remains higher than one month.

Example 3

The copolymer employed is that of Example 1. The formulation employed is identical with that of Example 1 except for the DBTL content, which has been doubled. The viscosity of the formulation is 870 mPa.s and rises to 1025 mPa.s after 4 hours at 130° C., an increase of 18%. The SAFT resistance greater than 200° C. is obtained after 5 days. The storage stability of the formulation is approximately 15 days.

Example 4

The copolymer employed has the following characteristics:

67% ethylene 30.2% vinyl acetate 2.8% VTMS

MI at 190° C.=600

Mn=4,100, Mw=14,500, polydispersity index=3.5.

The formulation employed is that of Example 2. The initial viscosity at 130° C. is 1160 cP; this value remains unchanged after 4 hours at 130° C. The initial cohesion is greater than 300 g after 15 seconds. The change in the SAFT resistance is as follows:

| Crosslinking time (in days) | 1 | 2 | 3 | 4 | 5 |
|---|---|---|---|---|---|
| SAFT resistance (in °C.) | 70 | 72 | 90 | 95 | >200 |

Example 5

The copolymer employed has the following characteristics:

69.2% ethylene 29.2% vinyl acetate

16% VTMS

MI at 190° C.=640

Mn=4,500, Mw=17,000, polydispersity index=3.6.

The formulation employed is that of Example 1. The initial viscosity at 130° C. is 1650 mPa.s and rises to 1850 mPa.s after 4 hours at 130° C., an increase of 12%. The initial cohesion is greater than 350 g after 15 seconds. The change in the SAFT resistance is as follows:

| Crosslinking time (in days) | 1 | 3 | 6 | 9 |
|---|---|---|---|---|
| SAFT resistance under 250 g (in °C.) | 80 | 92 | 105 | >200 |

The mechanical properties of the adhesive in bulk are as follows:

|  | Initial | After total crosslinking |
|---|---|---|
| Maximum tensile strength (MPa) | 1.5 | 1.95 |
| Elongation at break (%) | 60 | 100 |
| Shore A hardness | 70 | 76 |

Example 6

The copolymer employed has the following characteristics:

66.6% ethylene 30.7% vinyl acetate 2.7% VTMS

MI at 190°=470

Mn=7,000, Mw=37,000, polydispersity index=5.3.

The formulation employed is that of Example 1. The initial viscosity at 130° C. is 1975 mPa.s and rises to 2100 mPa.s after 4 hours at 130° C., an increase of 6%. The initial cohesion is greater than 350 g after 15 seconds. The change in the SAFT resistance is as follows:

| Crosslinking time (in days) | 1 | 2 | 3 | 4 | 5 |
|---|---|---|---|---|---|
| SAFT temperature under 250 g (in °C.) | 80 | 80 | 95 | 93 | >200 |

The mechanical properties of the adhesive in bulk are as follows:

|  | Initial | After total crosslinking |
|---|---|---|
| Maximum tensile strength (MPa) | 1.7 | 2.4 |
| Elongation at break (%) | 60 | 300 |
| Shore A hardness | 70 | 82 |

Example 7

This example illustrates the use of a modified aromatic tackifying resin (Hercures AR 100 from the Hercules Company). The formulation of the adhesive is as follows (parts by weight):

| E/VA/VTMS copolymer of Example 6 | 100 |
|---|---|
| Hercules AR 100 resin | 100 |
| 68–70° C. paraffin wax | 16 |
| Be Square 195 wax | 5.3 |
| DBTL | 0.14 |
| Laurylamine | 0.07 |
| VTMES | 2.2 |

The initial viscosity at 130° C. is 14,000 mPa.s and rises to 15,500 mPa.s after 4 hours at ambient temperature, an increase of 11%. The initial cohesion is greater than 350 g after 15 seconds. A SAFT resistance greater than 200° C. is reached in 6 days.

Example 8

This example illustrates the peel strength performance of the adhesives of the invention on aluminum and demonstrates the part played by the catalysts.

The formulations tested are as follows:

|  | Catalyzed Formulation | Uncatalyzed Formulation |
|---|---|---|
| E/VA/VTMS copolymer of Example 6 | 100 | 100 |
| Kristalex F85 | 32 | 32 |
| Escorez 5300 | 83 | 83 |
| Victory Amber wax | 22.4 | 22.4 |
| H₂ wax | 9.6 | 9.6 |
| Irganox 1010 | 3.2 | 3.2 |
| DBTL | 0.144 | — |
| Laurylamine | 0.035 | — |
| VTMES | 2.24 | — |

The initial cohesion is greater than 350 g after 15 seconds for both formulations. The change in the SAFT resistances and T peel strengths on aluminum are as follows:

| | Crosslinking time (in days) | | | | |
|---|---|---|---|---|---|
| | 1 | 3 | 6 | 10 | 36 |
| SAFT resistance under 250 g (in °C.) | | | | | |
| Catalyzed formulation | 70 | 150 | >200 | >200 | >200 |
| Uncatalyzed formulation | 68 | 69 | 69 | 69 | 69 |
| T peel strength (in N/cm) | | | | | |
| Catalyzed formulation | 34.6 CF | 41.6 CF | 40.5 CF | 34.1 CF | — |
| Uncatalyzed formulation | 41.8 CF | — | — | — | — | where CF = cohesive failure.

These results show:

that the catalyzed formulations of the invention offer satisfactory peel strengths on aluminum both immediately after adhesive bonding and after crosslinking;

that in the absence of catalyst there is no appreciable crosslinking even after several weeks exposure to the ambient atmosphere.

Example 9

This example and the ones which follow illustrate the performance of formulations which are catalyzed only with a tin salt.

The formulation employed is as follows:

| E/VA/VTMS copolymer of Example 6 | 100 |
|---|---|
| Krystalex F85 | 32 |
| Escorez 5300 | 83 |
| Victory Amber wax | 64 |
| H₂ wax | 32 |
| Irganox 1010 | 3.2 |
| DBTL | 0.14 |
| VTMES | 2.2 |

The initial viscosity at 130° C. is 1975 mPa.s and rises to 2050 mPa.s after 4 hours at this temperature. Initial cohesion is greater than 350 g after 15 seconds. The change in the properties of such an adhesive over time are as follows:

| | Crosslinking time (in days) | | | | | |
|---|---|---|---|---|---|---|
| | 1 | 2 | 3 | 4 | 8 | 14 |
| SAFT temperature under 250 g (in °C.) | 76 | 94 | 107 | 150 | >200 | >200 |
| Max. tensile strength (MPa) | 1.9 | — | — | — | — | 2.8 |
| Elongation at break % | 80 | — | — | — | — | 150 |

The storage stability at 25° C. is approximately 3 weeks in the absence of moisture.

Example 10

The formulation studied is as follows:

| E/VA/VTMS copolymer of Example 6 | 100 |
|---|---|
| Krystalex F 85 | 32 |
| Escorez 5300 | 83 |
| Victory Amber wax | 23 |
| H₂ wax | 9.6 |
| Irganox 1010 | 3.2 |
| DBTL | 0.14 |
| Laurylamine | 0.09 |
| VTMES | 2.2 |

The initial viscosity at 130° C. is 11,200 mPa.s and rises to 12,800 mPa.s after 4 hours at this temperature. Initial cohesion is greater than 350 g after 15 seconds. The change in the properties of such an adhesive over time is as follows:

| | Crosslinking time (in days) | | | | | |
|---|---|---|---|---|---|---|
| | 1 | 4 | 5 | 8 | 14 | 22 |
| SAFT temperature under 250 g (in °C.) | 69 | 150 | >200 | >200 | >200 | >200 |
| Max. tensile strength (MPa) | 0.9 | 1.0 | — | 1.4 | 1.8 | 2.1 |
| Elongation at break % | 200 | 400 | — | 650 | 630 | 690 |

Example 11

This example illustrates the performance of the hot-melt adhesives of the invention in peel strength on glass. The E/VA/VTMS copolymer employed has the following characteristics:

68.1% ethylene
29% vinyl acetate
2.9% VTMS
MI at 190° C.=700

The formulations tested are as follows:

| | A | B | C |
|---|---|---|---|
| E/VA/VTMS copolymer of Example 11 | 100 | 100 | 100 |
| Krystalex F85 | 32 | 32 | 32 |
| Escorez 5300 | 83 | 83 | 83 |
| Victory Amber wax | 22 | 22 | 22 |
| H₂ wax | 9.6 | 9.6 | 9.6 |
| DBTL | 0.036 | 0.036 | 0.094 |
| VTMES | — | 2.24 | 2.24 |

The initial cohesion is greater than 350 g after 15 seconds for the three formulations. The peel strength performance on glass is as follows (by the so-called floating rollers method).

|  | Crosslinking time (days) | | |
| --- | --- | --- | --- |
|  | 1 | 8 | 27 |
| Peel strength (N/cm) | | | |
| Formulation A | 24 CF | — | 24.3 CF |
| Formulation B | 16 CF | — | 20 CF |
| Formulation C | 20.1 CF | 16.7 CF | 18.2 CF | where CF = Cohesive failure.

It is observed that the peel strengths obtained are maintained after crosslinking of the adhesive.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

I claim:

1. A hot-melt adhesive composition comprising (1) a copolymer of ethylene, vinyl acetate and vinylalkoxysilane, (2) a tackifying resin and (3) at least one crosslinking catalyst, wherein the hot-melt adhesive composition comprises less than 1,000 ppm of water.

2. The hot-melt adhesive composition of claim 1, wherein the melt index of the copolymer at 190° C. is higher than about 150°.

3. The hot-melt adhesive composition of claim 1, wherein the vinylalkoxysilane is selected from the group consisting of vinyltrimethoxysilane and vinylmethyldimethoxysilane.

4. The hot-melt adhesive composition of claim 2, wherein the vinylalkoxysilane is selected from the group consisting of vinyltrimethoxysilane and vinylmethyldimethoxysilane.

5. The hot-melt adhesive composition of claim 1, wherein the catalyst comprises dibutyltin laurate.

6. The hot-melt adhesive composition of claim 2, wherein the catalyst comprises dibutyltin laurate.

7. The hot-melt adhesive composition of claim 3, wherein the catalyst comprises dibutyltin laurate.

8. The hot-melt adhesive composition of claim 4, wherein the catalyst comprises dibutyltin laurate.

9. The hot-melt adhesive composition of claim 1, wherein the catalyst comprises dibutyltin laurate and laurylamine.

10. The hot-melt adhesive composition of claim 2, wherein the catalyst comprises dibutyltin laurate and laurylamine.

11. The hot-melt adhesive composition of claim 3, wherein the catalyst comprises dibutyltin laurate and laurylamine.

12. The hot-melt adhesive composition of claim 4, wherein the catalyst comprises dibutyltin laurate and laurylamine.

13. The hot-melt adhesive composition of claim 1, wherein the composition includes a dehydrating agent.

14. A process for the manufacture of a hot-melt adhesive composition comprising (1) a copolymer of ethylene, vinyl acetate and vinylalkoxysilane, (2) a tackifying resin and (3) at least one crosslinking catalyst, wherein the hot-melt adhesive composition comprises less than 1,000 ppm of water, comprising: mixing the copolymer and the tackifying resin to form a mixture; drying the mixture under vacuum at a temperature lower than 180° C.; purging the mixture with a dry gas at a temperature lower than 180° C.; and adding to the mixture the catalyst.

15. The process of claim 14, further comprising selecting the purge temperature to be between about 100° C. and about 140° C.

16. The process of claim 14, further comprising selecting the drying temperature to be between about 100° C. and about 140° C.

17. The process of claim 16, further comprising selecting the purge temperature to be between about 100° C. and about 140° C.

* * * * *

UNITED STATES PATENT AND TRADEMARK OFFICE
CERTIFICATE OF CORRECTION

PATENT NO. : 5,731,384

DATED : March 24, 1998

INVENTOR(S) : Jean-Yves CHENARD

It is certified that error appears in the above-identified patent and that said Letters Patent is hereby corrected as shown below:

In column 2, lines 6 and 14, "°C." should be changed to --°C--.

In column 2, line 17, "150 °" should be changed to --150--.

In column 2, line 26, "°C." should be changed to --°C--; "150 °" should be changed to --150--.

In column 2, line 27, "400 ° and 1200 °" should be changed to --400 and 1200--.

In column 3, line 67, "°C." should be changed to --°C--.

In column 4, lines 3, 8, 14, 16 and 20, "°C." should be changed to --°C--.

In column 4, line 22, "Pa.s" should be changed to --Pa·s--".

In column 4, line 23, "°C." should be changed to --°C--.

In column 5, lines 4, 11, 23, 37 and 56, "°C." should be changed to --°C--.

In column 6, lines 19 and 33, "°C." should be changed to --°C--.

In column 6, line 34, "mPa.s" should be changed to --mPa·s--.

In column 6, line 35, "°C." should be changed to --°C--.

In column 6, line 36, "mPa.s" should be changed to --mPa·s--; "°C." should be changed to --°C--.

UNITED STATES PATENT AND TRADEMARK OFFICE
CERTIFICATE OF CORRECTION

PATENT NO. : 5,731,384
DATED : March 24, 1998
INVENTOR(S) : Jean-Yves CHENARD

It is certified that error appears in the above-identified patent and that said Letters Patent is hereby corrected as shown below:

In column 6, line 37, ""°C." should be changed to --°C--.

In column 6, line 38, "mPa.s" should be changed to --mPa·s--.

In column 6, line 67, ""°C." should be changed to --°C--; "mPa.s" should be changed to --mPa·s--.

In column 7, line 1, "mPa.s" should be changed to --mPa·s--; ""°C." should be changed to --°C--.

In column 7, line 2, ""°C." should be changed to --°C--.

In column 7, line 13, "mPa.s" should be changed to --mPa·s--.

In column 7, line 14, "mPa.s" should be changed to --mPa·s--; ""°C." should be changed to --°C--.

In column 7, lines 15, 28, 31 and 52, ""°C." should be changed to --°C--.

In column 7, lines 55 and 56, "mPa.s" should be changed to --mPa·s--; ""°C." should be changed to --°C--.

UNITED STATES PATENT AND TRADEMARK OFFICE
CERTIFICATE OF CORRECTION

PATENT NO. : 5,731,384
DATED : March 24, 1998
INVENTOR(S) : Jean-Yves CHENARD

Page 3 of 3

It is certified that error appears in the above-identified patent and that said Letters Patent is hereby corrected as shown below:

In column 8, lines 21, 22 and 57, "°C." should be changed to --°C--; "mPa.s" should be changed to --mPa·s--

In column 8, line 58, "mPa.s" should be changed to --mPa·s--.

In column 8, line 60, "°C." should be changed to --°C--.

In column 9, line 64, "°C." should be changed to --°C--; "mPa.s" should be changed to --mPa·s--.

In column 9, line 65, "mPa.s" should be changed to --mPa·s--.

In column 10, line 12, "°C." should be changed to --°C--.

In column 10, line 29, "°C." should be changed to --°C--; "mPa.s" should be changed to --mPa·s--.

In column 10, line 30, "mPa.s" should be changed to --mPa·s--.

In column 10, line 55, "°C." should be changed to --°C--.

In column 11, line 31, "°C." should be changed to --°C--.

In column 11, line 32, "150 °" should be changed to --150--.

In column 12, lines 29, 32, 35 and 38, "°C." should be changed to --°C--.

Signed and Sealed this

Eighteenth Day of May, 1999

Attest:

Q. TODD DICKINSON

*Attesting Officer*    *Acting Commissioner of Patents and Trademarks*